(12) United States Patent
Horiguchi (10) Patent No.: US 9,347,802 B2
(45) Date of Patent: May 24, 2016

(54) SCALE, VERNIER ENCODER AND APPARATUS USING THE SAME

(71) Applicant: CANON KABUSHIKI KAISHA, Tokyo (JP)

(72) Inventor: Haruhiko Horiguchi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 245 days.

(21) Appl. No.: 13/886,311

(22) Filed: May 3, 2013

(65) Prior Publication Data

US 2013/0292558 A1 Nov. 7, 2013

(30) Foreign Application Priority Data

May 7, 2012 (JP) ................................ 2012-105710

(51) Int. Cl.
*G01D 5/347* (2006.01)
(52) U.S. Cl.
CPC ............ *G01D 5/34715* (2013.01); *G01D 5/347* (2013.01)
(58) Field of Classification Search
CPC . G01D 5/347; G01D 5/34715; G01D 5/3473; G01D 5/34707; G01D 5/34776; G01D 5/34792; G01D 5/34784; H03M 1/00; H03M 2201/4125; H03M 2201/4233; H03M 2201/2185; H03M 2201/4225; H03M 2201/01; H03M 2201/93; H05K 13/0413; H05K 13/08; B23Q 17/22; B23Q 17/24; G01B 11/026; G01B 11/002; G01B 11/14; G01B 11/00; G01B 11/024; G01B 11/02; G01B 11/26; G01B 11/272; G01B 11/028; G06K 7/10722; G06K 7/10732; G06K 7/10762; G01G 23/20

USPC ............ 250/231.13, 231.16, 237 G; 359/436; 341/13, 15; 33/1 L; 356/614–617, 622, 356/624

See application file for complete search history.

(56) References Cited

U.S. PATENT DOCUMENTS

| 3,768,094 A * | 10/1973 | Henrich .......................... 341/15 |
| 2011/0049341 A1 | 3/2011 | Nakajima et al. |
| 2012/0018626 A1 | 1/2012 | Nagura |
| 2012/0126103 A1 | 5/2012 | Yamamoto et al. |

FOREIGN PATENT DOCUMENTS

JP 2011-033464 A 2/2011

OTHER PUBLICATIONS

European Search Report issued in European counterpart application No. EP13166364.3, dated Mar. 20, 2015.

* cited by examiner

*Primary Examiner* — Seung C Sohn
(74) *Attorney, Agent, or Firm* — Rossi, Kimms & McDowell LLP (57) ABSTRACT

The scale for a vernier encoder including a sensor relatively movable with the scale in a first direction and configured to read periodic patterns provided in the scale. The scale includes first and second scale tracks each including multiple periodic patterns having mutually different periods in the first direction and being arranged parallel in a second direction. The multiple periodic patterns form, between the first and second scale tracks, multiple pairs of periodic patterns to be used for producing multiple periodic signals, each periodic signal being produced by vernier operation. In at least one of the first and second scale tracks, a first periodic pattern, which is used for producing a shortest period periodic signal among the multiple periodic signals, is provided closest to a boundary between the first and second scale tracks among the multiple periodic patterns.

8 Claims, 9 Drawing Sheets

PRIOR ART

SCALE, VERNIER ENCODER AND APPARATUS USING THE SAME

BACKGROUND OF THE INVENTION

1. Field of the Invention

The present invention relates to an encoder to be used for detecting position (or movement/rotation amount) of a movable member by using a vernier method.

2. Description of the Related Art

Encoders to be used for position detection include optical encoders and magnetic encoders, both of which are constituted by a sensor to be attached to one of a movable member and a fixed (immovable) member and a scale to be attached to the other of the sensor and the scale. The scale is provided with a periodic pattern periodically transmitting or reflecting light or periodically changing intensity of magnetic field. When the movable member is moved or rotated with respect to the fixed member and thereby the sensor and the scale are relatively moved, the sensor optically or magnetically reads the periodic pattern in the scale to produce an electric signal (sensor output signal) corresponding to the periodic pattern. Calculation using this sensor output signal enables detection of position (or movement/rotation amount) of the movable member.

Japanese Patent Laid-Open No. 2011-033464 discloses an encoder including a scale that is provided with multiple (two) periodic patterns arranged parallel and having a phase difference therebetween. In this encoder, a sensor including two light receivers reads these two periodic patterns to produce two sensor output signals having a phase difference therebetween. Performing a calculation using the sensor output signals enables position detection with higher resolution.

Figure 12:
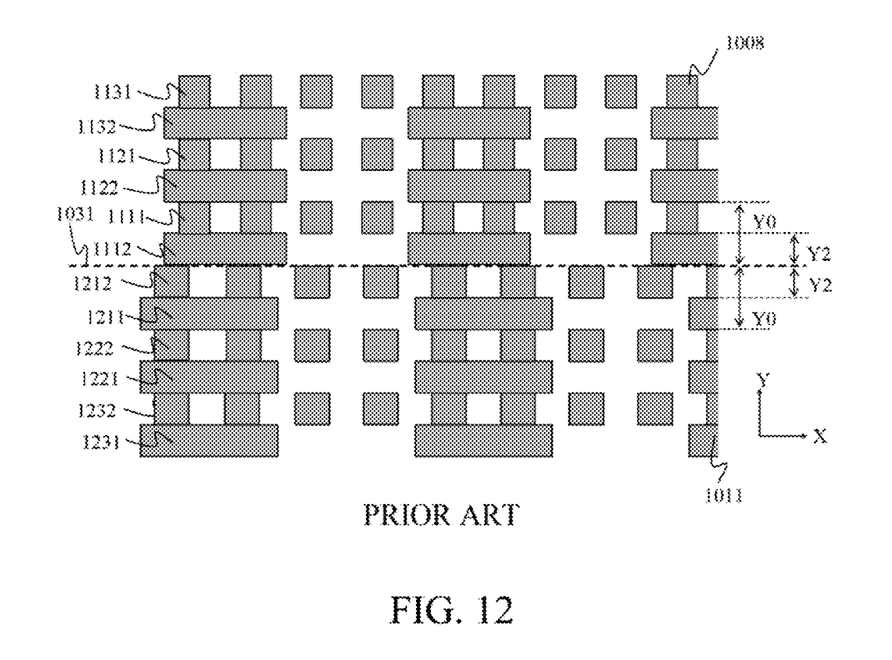
FIG. 12 shows a conventional multiple periodic pattern scale.

Moreover, the inventor of the present invention researches a vernier encoder, such as one shown in FIG. 12, which uses a scale provided with two scale tracks 1008 and 1011. Each of the scale tracks 1008 and 1011 includes multiple periodic patterns arranged parallel and having mutually different periods. For example, the scale track 1008 alternately includes periodic patterns (each hereinafter referred to as "a coarse pattern") 1111, 1121 and 1131 1112, 1122 and 1132 having long periods and periodic patterns (each hereinafter referred to as "a fine pattern") 1112, 1122 and 11-32 1111, 1121 and 1131 having short periods. Moreover, the scale track 1011 alternately includes coarse patterns 1211, 1221 and 1231 and fine patterns 1212, 1222 and 1232. The coarse patterns forming a pair between the two scale tracks have slightly different periods from each other, and the fine patterns forming a pair between the two scale tracks also have slightly different periods from each other.

A sensor of this encoder reads the paired coarse patterns to provide two sensor output signals having long periods slightly different from each other. Then, the encoder performs a vernier operation to calculate a phase difference between the two sensor output signals and produces therefrom a vernier periodic signal having a long period different from those of the two sensor output signals. Similarly, the encoder reads the paired fine patterns to provide two sensor output signals having short periods slightly different from each other. Then, the encoder performs the vernier operation to calculate a phase difference between the two sensor output signals and produces therefrom another vernier periodic signal having a short period different from those of the two sensor output signals. The encoder uses the long period vernier periodic signal thus obtained as a high-level signal Sv1 and uses the short period vernier periodic signal as a middle-level signal Sv2, and synchronizes the high-level signal Sv1 and the middle-level signal Sv2 to enable position detection.

However, when using such a scale provided with the two scale tracks (hereinafter also referred to as "a multiple track scale"), there are the following problems. First, the movable member and the fixed member to which the sensor and the scale are attached often have mechanical backlash therebetween in a scale width direction (Y direction in FIG. 12) orthogonal to a position detection direction (X direction in FIG. 12) that is a direction in which each periodic pattern extends. The mechanical backlash causes a relative positional shift between the sensor and the scale in the scale width direction, which causes so-called cross talk in which the sensor reads the periodic pattern in the scale track different from the scale track that the sensor should read. The cross talk results in a position detection error as shown in FIG. 13.

Figure 13:
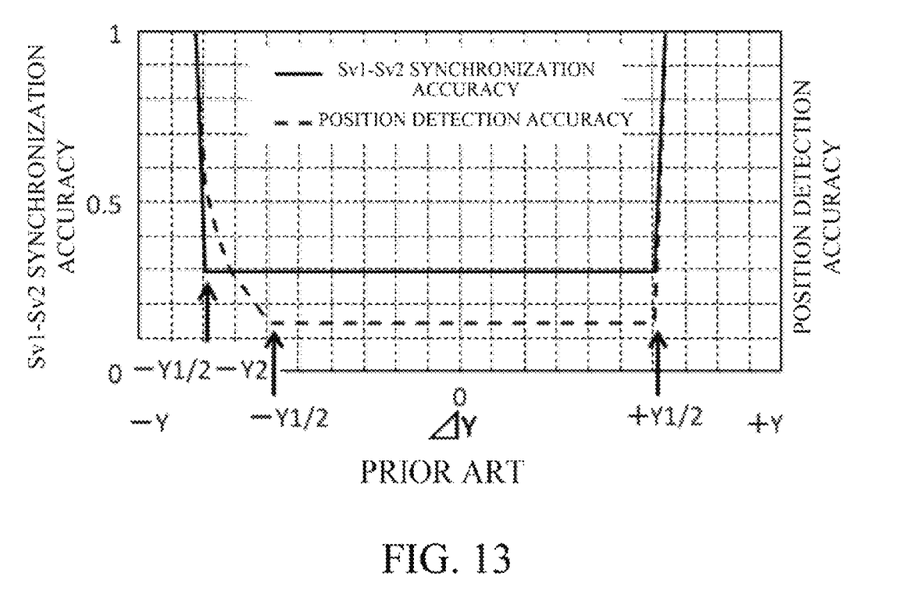
FIG. 13 is a graph showing a relation among relative positional shift amount between the conventional multiple periodic pattern shown in FIG. 12 and a sensor, synchronization accuracy and position detection accuracy.

FIG. 13 is a graph showing dependence of synchronization accuracy of the high- and middle-level signals Sv1 and Sv2 and dependence of position detection accuracy on relative positional shift amount between the sensor and the scale in the Y direction. A solid line shows the synchronization accuracy of the high- and middle-level signals Sv1 and Sv2, and a broken line shows the position detection accuracy. A horizontal axis shows the relative positional shift amount between the sensor and the scale in the Y direction.

The relative positional shift amount between the sensor and the scale in a +Y direction in FIG. 13 corresponds to a positional shift amount of the sensor with respect to the scale in an upper direction in FIG. 12, and the relative positional shift amount between the sensor and the scale in a −Y direction in FIG. 13 corresponds to a positional shift amount of the sensor with respect to the scale in a lower direction in FIG. 12. A first vertical axis on a left side in the graph shows the synchronization accuracy between the high- and middle-level signals Sv1 and Sv2. A synchronization accuracy exceeding 1 makes the synchronization between the high- and middle-level signals Sv1 and Sv2 impossible. On the other hand, a second vertical axis on a right side in the graph shows the position detection accuracy. Moreover, Y1 represents a distance between a light emitter and a light receiver of the sensor in the scale width direction (see FIG. 1B).

The cross talk caused in the high-level signal Sv1 deteriorates the synchronization accuracy of the high- and low-level signals Sv1 and Sv2 and thereby might make it impossible to synchronize the high- and low-level signals Sv1 and Sv2. In FIG. 12, when the relative positional shift amount of the sensor and scale is ±Y1/2, a sensor reading area where the sensor can read the periodic pattern includes a boundary 1031 between the two scale tracks, which causes the sensor to perform cross talk reading of the long period pattern (for example, the periodic pattern 1112) and the short periodic pattern (for example, the periodic pattern 1212) respectively included in the mutually different scale tracks.

In addition, increase of the relative positional shift amount of the sensor and scale makes the cross talk significant. Particularly, increase of the relative positional shift amount in the +Y direction increases influence of the cross talk on the high-level signal Sv1, which results in deterioration of accuracy of the high-level signal Sv1 and also results in the synchronization accuracy between the high- and middle-level signals Sv1 and Sv2. The deterioration of the synchronization accuracy causes an error corresponding to at least one period in the middle-level signal Sv2, which significantly deteriorates the position detection accuracy as in the case where the relative positional shift amount is +Y1/2.

As a countermeasure to these problems, a method can be considered which increases a distance between the light emitter and the light receiver of the sensor to enable suppression of occurrence of the cross talk even though the sensor and the scale are largely relatively shifted in the Y direction. However, this method increases in size of the sensor and thus that of the entire encoder, which is undesirable.

SUMMARY OF THE INVENTION

The present invention provides a scale to be used for a vernier encoder, which includes a multiple track scale and is capable of increasing an allowable relative movement amount between the multiple track scale and a sensor in a scale width direction, without increasing in size of the sensor or the entire encoder. Moreover, the present invention provides a vernier encoder using such a scale and provides an apparatus using such a vernier encoder.

The present invention provides as one aspect thereof a scale to be used for a vernier encoder including a sensor relatively movable with the scale in a first direction and configured to read periodic patterns provided in the scale. The scale includes a first scale track and a second scale track each including multiple periodic patterns having mutually different periods in the first direction and being arranged parallel in a second direction orthogonal to the first direction. The multiple periodic patterns included in the respective first and second scale tracks form, between the first and second scale tracks, multiple pairs of periodic patterns to be used for producing multiple periodic signals having mutually different periods, each periodic signal being produced by vernier operation performed on output from the sensor that reads each pair of periodic patterns. In at least one of the first and second scale tracks, a first periodic pattern of the multiple periodic patterns, which is used for producing a first periodic signal having a shortest period among the multiple periodic signals, is provided closest to a boundary between the first and second scale tracks among the multiple periodic patterns.

The present invention provides as another aspect thereof a vernier encoder including the above-mentioned scale and sensor.

The present invention provides as still another aspect thereof an apparatus including the above-mentioned vernier encoder and a movable member to which one of the scale and the sensor is attached is movable with respect to a fixed member to which the other of the scale and the sensor is attached.

Further features of the present invention will become apparent from the following description of exemplary embodiments with reference to the attached drawings.

DESCRIPTION OF THE PREFERRED EMBODIMENTS

Embodiments of the present invention will hereinafter be described with reference to the accompanying drawings.

Embodiment 1

Figure 1A:
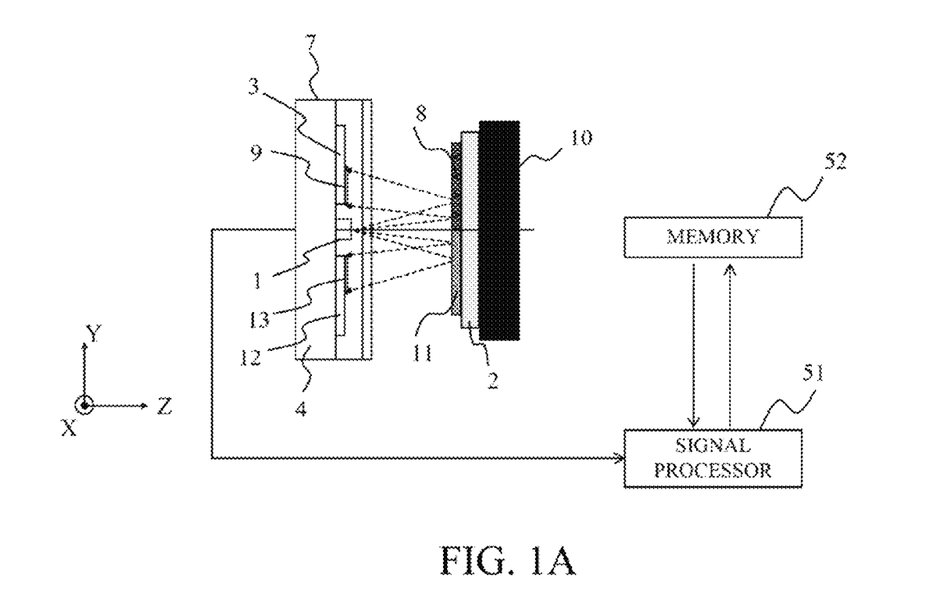
FIGS. 1A and 1B show a configuration of a vernier encoder that is Embodiment 1 of the present invention.
Figure 1B:
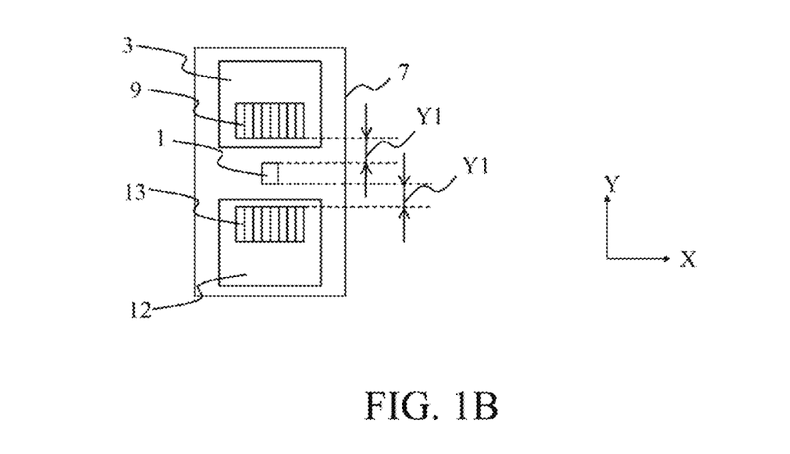

FIGS. 1A and 1B show a configuration of a vernier encoder that is a first embodiment (Embodiment 1) of the present invention. The encoder is constituted by a sensor unit 7 and a scale 2. The sensor unit 7 is attached to a fixed member that is a member fixed to an immovable member such as a chassis of an apparatus (not shown) or a member fixed to the chassis. The scale 2 is attached to a movable member as a position detection object member that is linearly movable or rotatable with respect to the fixed member. The encoder also includes a signal processor 51 and a memory 52.

A configuration may be employed in which the sensor unit 7 is attached to the movable member and the scale 2 is attached to the fixed member. That is, it is only necessary that the sensor unit 7 and the scale 2 are relatively moved.

In FIGS. 1A and 1B, an X direction (first direction) in which an X axis extends corresponds to a direction in which position detection is performed by the relative movement of the sensor unit 7 and scale 2; this direction is hereinafter referred to as "a position detection direction". On the other hand, a Y direction (second direction) in which a Y axis orthogonal to the X axis extends corresponds to a direction of a width of periodic patterns (later described) provided in the scale 2 so as to extend in the position detection direction; this direction is hereinafter referred to as "a scale width direction". In addition, a Z direction in which a Z axis orthogonal to the X and Y axes extends corresponds to a direction in which the sensor unit faces the scale 2, that is, the sensor unit 7 reads the periodic patterns of the scale 2; this direction is hereinafter referred to as "a scale read direction". FIG. 1A shows the encoder viewed from the position detection direction, and FIG. 1B shows the encoder viewed from the scale read direction.

The signal processor 51 performs an interpolation process on a sensor output signal produced by the sensor unit 7; reading and writing of a position signal (position information) from and to the memory 52; outputting of the position signal; and others.

This embodiment describes a case of using as the sensor unit 7 a reflective optical sensor. However, the sensor unit 7 may be a transmissive optical sensor or a magnetic sensor. In the reflective optical sensor, the scale 2 is provided with periodic patterns whose each reflectance for light periodically changes in the position detection direction, in other words, each having a reflectance distribution in that direction. On the other hand, in the transmissive optical sensor, the scale 2 is provided with periodic patterns whose each transmittance for light periodically changes in the position detection direction, in other words, each having a transmittance distribution in that direction. Furthermore, in the magnetic sensor, the scale 2 is provided with periodic patterns each periodically changing intensity of magnetic field.

The sensor unit 7 as one of the above-mentioned optical sensors is unitized by housing, in one package, a light emitter 1 whose light source is an LED, a semiconductor element constituting a photo IC chip and a printed wiring board 4 on which the light emitter 1 and the semiconductor element are mounted. The photo IC chip incorporates a first light receiver 3 including a plurality of light receiving elements (hereinafter referred to as "a first light receiving element array) 9, a second light receiver 12 including a plurality of light receiving elements (hereinafter referred to as "a second light receiving element array) 13 and a sensor processor performing processes such as current-voltage (I-V) conversion. This embodiment describes a case of using, as the first and second light receiving element arrays 9 and 13, two light receiving element arrays including a same number of light receiving elements arranged at a same pitch. However, two light receiving element arrays including light receiving elements arranged at different pitches each optimized to periods of periodic patterns to be read by the two light receiving element arrays may be used as the first and second light receiving element arrays 9 and 13.

The sensor unit 7 is disposed so as to face the scale 2. Light as a divergent light flux emitted from the light emitter (light source) 1 of the sensor unit 7 is projected onto the first and second scale tracks 8 and 11 of the scale 2. The light projected onto the first scale track 8 is reflected by multiple periodic patterns provided in the first scale track 8 and proceeds toward the first light receiving element array 9 of the sensor unit 7 to form thereon optical images of the multiple periodic patterns of the first scale track 8. On the other hand, the light projected onto the second scale track 11 is reflected by multiple periodic patterns provided in the second scale track 11 and proceeds toward the second light receiving element array 13 of the sensor unit 7 to form thereon optical images of the multiple periodic patterns of the second scale track 11. The first and second light receivers 3 and 12 photoelectrically convert the optical images of the multiple periodic patterns (that is, read the multiple periodic patterns) respectively formed on the first and second light receiving element arrays 9 and 13, and then output sensor output signals as periodic signals respectively corresponding to the multiple periodic patterns to the signal processor 51 shown in FIG. 1A.

Figure 2:
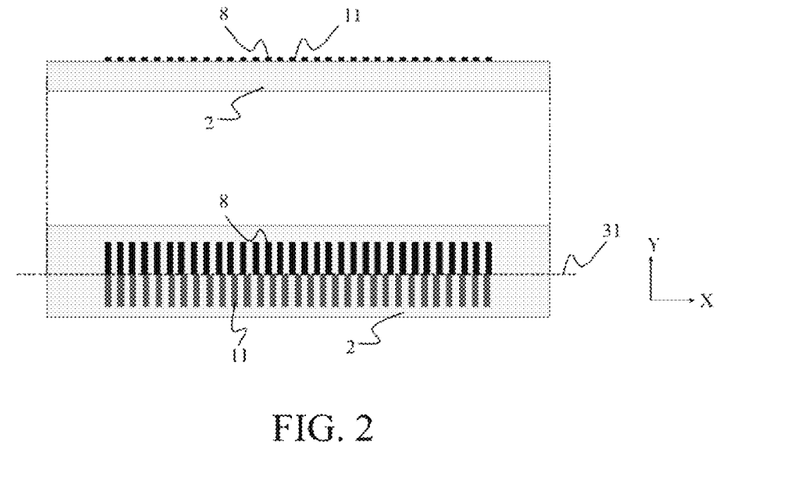
FIG. 2 shows a scale to be used for the encoder of Embodiment 1.

An upper part of FIG. 2 shows a cross section of the scale 2 viewed from the scale width direction, and a lower part of FIG. 2 shows the scale 2 viewed from the scale read direction. The scale 2 includes a base member made of plastic such as polycarbonate or of metal such as SUS. On a surface of the base member, reflective films are formed of metal such as aluminum or chrome with a predetermined period. Alternate arrangement of the high reflectance portions where the reflective films are formed and low reflectance portions where the reflective films are not formed in the position detection direction provides one periodic pattern having a period corresponding to the above predetermined period.

Figure 3:
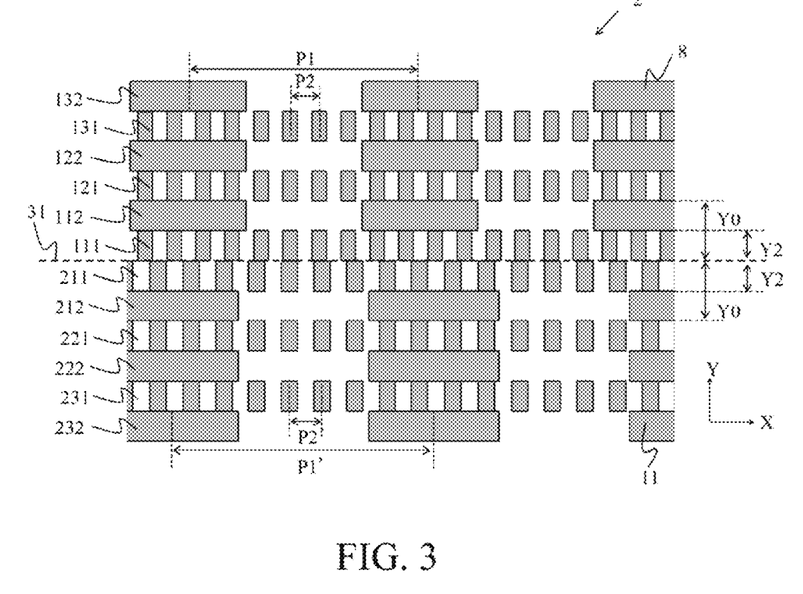
FIG. 3 is an enlarged view showing a boundary of scale tracks and a vicinity thereof on the scale in Embodiment 1.

FIG. 3 shows the multiple periodic patterns provided in the respective first and second scale tracks 8 and 11 of the scale 2. FIG. 3 shows an enlarged view of the periodic patterns in a region close to a boundary 31 between the first and second scale tracks 8 and 11. In the first and second scale tracks 8 and 11 of an actual scale 2, a greater number of periodic patterns than the periodic patterns shown in FIG. 3 are provided in the scale width direction.

In the first scale track 8, two types of (that is, multiple) periodic patterns having mutually different periods (long and short periods) P1 and P2 are provided. Specifically, long period periodic patterns 112, 122 and 132 having the long period P1 and short period periodic patterns 111, 121 and 131 having the short period P2 are provided alternately and parallel in the scale width direction.

On the other hand, in the second scale track 11, two types of (that is, multiple) periodic patterns having mutually different periods (long and short periods) P1' and P2' are provided. Specifically, long period periodic patterns 212, 222 and 232 having the long period P1' and short period periodic patterns 211, 221 and 231 having the short period P2' are provided alternately and parallel in the scale width direction.

Of the periods of the two types of periodic patterns provided in the first and second scale tracks 8 and 11, the long periods P1 and P1' are slightly different from each other (P1<P1'), and the short periods P2 and P2' are also slightly different from each other (P2<P2').

The signal processor 51 calculates a phase difference between the sensor output signals output from the first and second light receivers 3 and 12; the sensor output signals correspond to the periodic patterns forming a pair between the first and second scale tracks 8 and 11 and having the periods P1 and P1'. Then, the signal processor 51 produces a vernier periodic signal having a period different from those of the original sensor output signals. Such processes of calculation and signal production are collectively referred to as "vernier operation". Moreover, the signal processor 51 also performs the vernier operation on the sensor output signals output from the first and second light receivers 3 and 12; the sensor output signals correspond to the periodic patterns forming a pair between the first and second scale tracks 8 and 11 and having the periods P2 and P2'. Such a method of performing position detection using the vernier operation is called "vernier position detection". In the following description, the sensor output signals corresponding to the periodic patterns having the periods P1 and P1' are respectively also referred to as "a P1 period sensor output signal" and "a P1' period sensor output signal", and the sensor output signals corresponding to the periodic patterns having the periods P2 and P2' are respectively also referred to as "a P2 period sensor output signal" and "a P2' period sensor output signal".

A long period vernier signal that is the vernier periodic signal obtained from the P1 and P1' period sensor output signals has a period (hereinafter referred to as "a long vernier period") corresponding to a lowest common multiple of P1 and P1'. The periods P1 and P1' are decided such that this long vernier period becomes a desired long period. Similarly, a short period vernier signal that is the vernier periodic signal obtained from the P2 and P2' period sensor output signals has a period (hereinafter referred to as "a short vernier period") corresponding to a lowest common multiple of P2 and P2'. The periods P2 and P2' are decided such that this short vernier period becomes a desired short period.

In each of the first and second scale tracks 8 and 11, the multiple periodic patterns (two types of periodic patterns in this embodiment) are arranged with respect to the boundary 31 between the first and second scale tracks 8 and 11 as follows. The boundary 31 between the first and second scale tracks 8 and 11 is hereinafter referred to as "a track boundary 31".

First, a periodic pattern (hereinafter referred to as "a first periodic pattern") of the multiple periodic patterns, which is used for producing a vernier periodic signal (shortest period vernier periodic signal) having a shortest period among the vernier periodic signals to be produced, is provided closest to the track boundary 31 among the multiple periodic patterns. The first periodic pattern in this embodiment corresponds to the periodic patterns whose periods are P2 and P2' that are the shortest periods in the first and second scale tracks 8 and 11, respectively.

However, the first periodic pattern is not necessarily required to be a periodic pattern having a shortest period in each scale track. In other words, an order of period length of the periodic patterns is not required to coincide with that of period length of the vernier periodic signals to be produced.

Moreover, the first and second scale tracks 8 and 11 are adjoined to each other at the track boundary 31, and the first periodic patterns, which are the periodic patterns having the shortest periods P2 and P2' in this embodiment, are adjoined to the track boundary 31. In other words, the first periodic patterns (having the shortest periods P2 and P2' in this embodiment) are adjoined to each other with the track boundary 31 located therebetween. However, the first periodic patterns included in the first and second scale tracks are not necessarily required to adjoin to the track boundary 31 or to each other, that is, these first periodic patterns may have a gap therebetween.

In addition, in this embodiment, an arrangement order of the multiple (two types of) periodic patterns in the scale width direction in the first scale track 8 and that of the multiple periodic patterns in the second scale track 11 are line symmetry with respect to the track boundary 31. That is, the periods of the periodic patterns in the first scale track 8 are P2, P1, P2, ... from a track boundary side (first side closer to the track boundary 31) toward an opposite-to-track boundary side (second side farther from the track boundary 31), and the periods of the periodic patterns in the second scale track 11 are P2', P1', P2', ... from the track boundary side toward the opposite-to-track boundary side.

With this arrangement order, in each scale track, a periodic pattern (hereinafter referred to as "a second periodic pattern") of the multiple periodic patterns, which is used for producing a vernier periodic signal (longest period periodic signal) having a longest period among the vernier periodic signals to be produced, is provided farthest from the track boundary 31 among the multiple periodic patterns. The second periodic pattern in this embodiment corresponds to the periodic patterns having the long periods P1 and P1' in the first and second scale tracks 8 and 11, respectively.

This embodiment describes the case where the first periodic patterns to be used for producing the vernier periodic signal having the shortest period are provided closest to the track boundary 31 among the multiple periodic patterns in both the first and second scale tracks 8 and 11. However, it is only necessary that, in at least one of the first and second scale tracks, the first periodic pattern to be used for producing the vernier periodic signal having the shortest period be provided closest to the track boundary among the multiple periodic patterns.

Next, description will be made of a position detection method using the encoder of this embodiment with reference to FIGS. 3 to 7. In the encoder, the sensor unit 7 reads, by switching its detection spatial resolution, the periodic patterns having the long periods P1 and P1' and the periodic patterns having the short periods P2 and P2', which are provided in the first and second scale tracks 8 and 11 on the scale 2.

The following description is made of an exemplary case where the period (scale pitch) P1 is 800 μm, the period P1' is 816 μm, the period P2 is 100 μm, the period P2' is 102 μm and a total length (total stroke) of each of the periodic patterns is 40800 μm.

Figure 4:
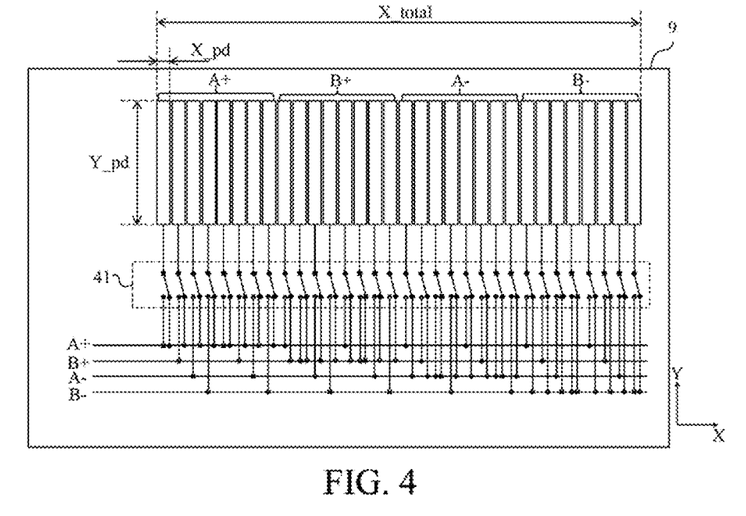
FIG. 4 shows arrangement of light receiving element array on a light receiving surface for detection of a first periodic pattern in Embodiment 1.
Figure 5:
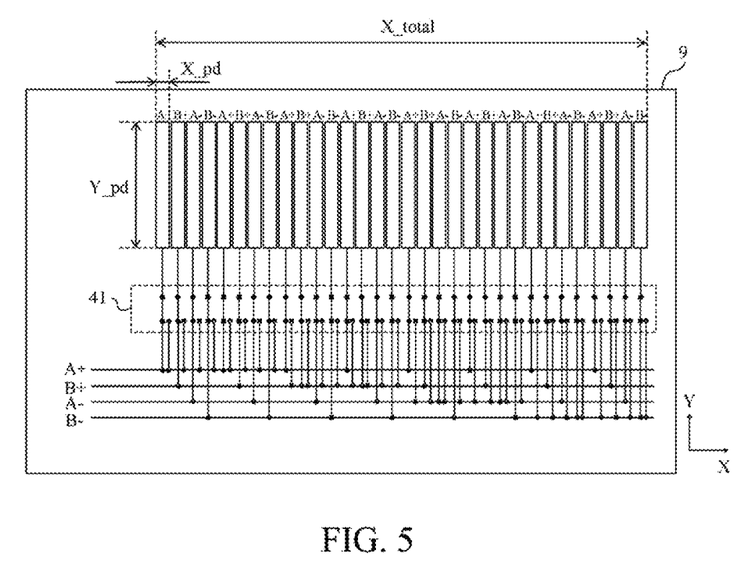
FIG. 5 shows arrangement of light receiving element array on the light receiving surface for detection of a second periodic pattern in Embodiment 1.
Figure 6:
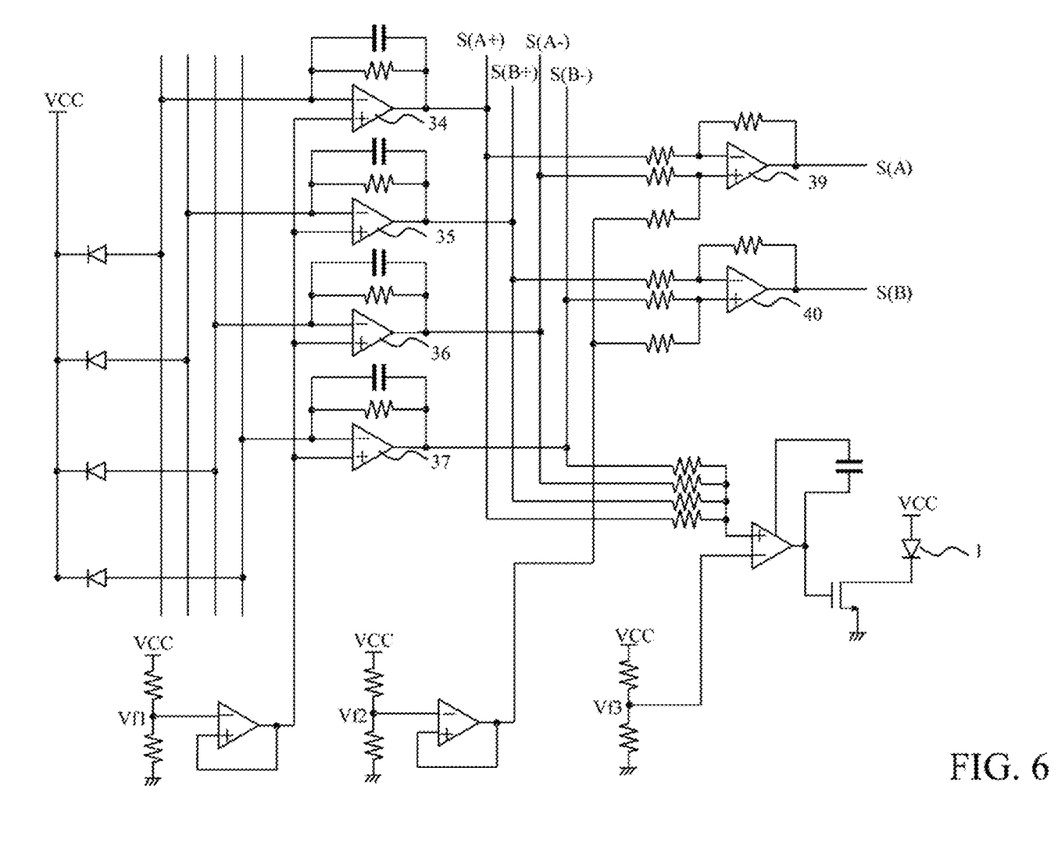
FIG. 6 shows a signal processor in Embodiment 1.

First, reading of the periodic patterns in the first scale track 8 and a process performed on the periodic signal corresponding to the read periodic patterns are described. FIGS. 4 and 5 show the first light receiving element array 9 provided in the first light receiver 3 of the sensor unit 7. FIG. 6 shows a configuration of the signal processor 51 of the sensor unit 7.

In the first light receiving element array 9, light receiving elements are lined up in the position detection direction (X direction). A length X_pd of each light receiving element in the X direction is 50 μm, and a width Y_pd thereof in the Y direction is 600 μm. A total length X_total of the first light receiving element array 9 in the X direction is 1600 μm. The periods P1 and P2 of the periodic patterns in the first scale track 8 are respectively set to integral multiples of the X direction length X_pd of one light receiving element.

The Y direction width Y_pd of each light receiving element is not necessarily required to be 600 μm. However, when light emission intensity control of the light emitter (light source) 1 is performed on a basis of an amount of received light of the light receiving element, it is desirable that the amount of received light be not changed regardless of a sensor reading position (position of an area where the sensor unit 7 reads the periodic pattern) on the first scale track 8 in the Y direction. Therefore, it is desirable that the Y direction width Y_pd be a value corresponding to 2×n times (n represents a natural number) of a Y direction width Y0 of one group of mutually adjacent periodic patterns having the long and short periods in the first scale track 8.

Output from the respective light receiving elements are selectively input, through switches 41 to be switched by a switching circuit (not shown), to subsequent four first stage amplifiers (A+, B+, A− and B−). The switching circuit is capable of switching the switch 41 between connection and disconnection in response to an input signal from its outside. For example, when the input signal from the outside has a high level, as shown in FIG. 4, eight light receiving elements adjacent to one another are electrically connected, and their outputs are input to one same first stage amplifier. Thereby, the first light receiver 3 becomes a long period pattern detection state of detecting the periodic pattern having the period of 800 μm (=P1). Moreover, when the input signal from the outside has a low level, as shown in FIG. 5, eight light receiving elements arranged at intervals of three light receiving elements are electrically connected, and their outputs are input to one same first stage amplifier. Thereby, the first light receiver 3 becomes a short period pattern detection state of detecting the periodic pattern having the period of 100 μm (=P2). The periods 800 μm and 100 μm correspond to the detection period of the first light receiver 3.

As described above, the first light receiver is capable of reading the periodic patterns having the long and short periods P1 and P2 separately from each other depending on whether the input signal to the switching circuit has the high level or the low level. In other words, the first light receiver 3 is capable of producing (acquiring) the P1 and P2 period sensor output signals separately from each other, and thus can switch the detection spatial resolution. The switching of the detection spatial resolution also applies to the second light receiver 12.

The four first stage amplifiers 34, 35, 36 and 37 shown in FIG. 6 are I-V conversion amplifiers, and outputs thereof correspond to four phase sinusoidal outputs S(A+), S(B+), S(A−) and S(B−). The four phase sinusoidal outputs have a relation that, when one detection period is 360 degrees and the output S(A+) is a reference (0 degree), the output S(B+) is about +90 degrees with respect to the output S(A+), the output S(A−) is about +180 degrees with respect thereto and the output S(B−) is about +270 degrees with respect thereto. The sensor processor included in the sensor unit 7 performs the following differential operation on these sinusoidal outputs through an A-phase differential amplifier 39 and a B-phase differential amplifier 40:

$$S(A)=S(A+)-S(A-) \qquad (1)$$

$$S(B)=S(B+)-S(B-) \qquad (2)$$

This differential operation provides two sinusoidal sensor output signals S(A) and S(B) from which a DC component is removed.

In addition, the signal processor 51 shown in FIG. 1A performs the following calculation from the sensor outputs S(A) and S(B) when the input signals to the switching circuit has the high level and the detection period of the first light receiver 3 is 800 μm (=P1):

$$\Phi 1 = A\ TAN\ 2[S(A),S(B)] \qquad (3)$$

In the expression (3), ATAN2[Y, X] represents an arctangent function determining a quadrant of coordinates (Y,X) and converting it into a phase from 0 to $2\pi$.

Similarly, the signal processor 51 performs the following calculation from the sensor outputs S(A) and S(B) when the input signals to the switching circuit has the low level and the detection period of the first light receiver 3 is 100 μm (=P2):

$$\Phi 2 = A\ TAN\ 2[S(A),S(B)] \qquad (4)$$

Next, description will be made of a process performed on the sensor output signal corresponding to the periodic pattern in the second scale track 11. The periods P1' and P2' of the periodic patterns in the second scale track 11 are slightly different from the detection periods of the second light receiver 12, which are 800 μm and 100 μm equal to those of the first light receiver 3. Therefore, it is desirable to perform, on the two phase sinusoidal sensor output signals S(A)' and S(B)' acquired by the above-described differential operation for the second scale track 11, a process for correcting a relative phase difference therebetween. First, description is made of the relative phase difference correction process in a case where the detection period of the second light receiver 12 is 816 μm (=P1').

The sensor output signals S(A)' and S(B)' including a relative phase difference error e1 are expressed by the following expressions (5) and (6) where θ represents a phase:

$$S(A)'=\cos(\theta+e1/2) \qquad (5)$$

$$S(B)'=\sin(\theta-e1/2) \qquad (6)$$

Then, adding and subtracting the sensor output signals S(A)' and S(B)' enables separation of the relative phase difference error e1 as shown by the following expressions (7) and (8):

$$S(A)'+S(B)'=2\times\cos(\theta-\pi/4)\sin(e1/2-\pi/4) \qquad (7)$$

$$-S(A)'+S(B)'=2\times\sin(\theta-\pi/4)\cos(e1/2-\pi/4) \qquad (8)$$

The relative phase difference error e1 is expressed by using a designed value:

$$e1=(1-800/816)\times\pi.$$

Thus, the signal processor 51 calculates corrected sensor output signals S(A) and S(B) whose phase difference error is corrected by multiplying S(A)'+S(B)' and −S(A)'+S(B)' by inverses of amplitude components $2\times\sin(e1/2-\pi/4)$ and $2\times\cos(e1/2-\pi/4)$ in the expressions (7) and (8), as shown in the following expressions (9) and (10) where $\phi=\theta-\pi/4$:

$$S(A)'=(S(A)'+S(B)')/(2\times\sin(e1/2-\pi/4))=\cos\phi \qquad (9)$$

$$S(B)'=(-S(A)'+S(B)')/(2\times\cos(e1/2-\pi/4))=\sin\phi \qquad (10)$$

The relative phase difference error e1 may be stored by an initialization operation. For example, the signal processor 51 calculates, by using a maximum value and a minimum value of S(A)'+S(B)' in a predetermined range in the X direction, a value of (maximum value−minimum value)/2, and acquires the amplitude component $2\times\sin(e1/2-\pi/4)$ from that calculated value. Moreover, the signal processor 51 calculates, by using a maximum value and a minimum value of −S(A)'+S(B)', a value of (maximum value−minimum value)/2, and acquires the amplitude component $2\times\cos(e1/2-\pi/4)$ from that calculated value.

Then, the signal processor 51 stores these amplitude components in the memory 52. In this case, the correction of the relative phase difference can be made which includes correction of an error of an image magnification caused by a mount height displacement between the light emitter 1 and the second light receiving element array 13 and by relative tilt of the scale 2 and the sensor unit 7.

Also in a case where the detection period of the second light emitter 12 is 102 μm (=P2'), the signal processor 51 acquires the sensor output signals S(A) and S(B) by performing the same process.

The signal processor 51 performs the following calculation by using the sensor output signals S(A) and S(B) thus acquired. First, the signal processor 51 performs calculation shown by the following expression (11) using the sensor output signals S(A) and S(B) in the case where the input signal has the high level and the detection period of the second light receiver 12 is 800 μm:

$$\Phi 1' = A\ TAN\ 2[S(A),S(B)] \qquad (11)$$

Moreover, the signal processor 51 performs calculation shown by the following expression (12) using the sensor output signals S(A) and S(B) in the case where the input signal has the low level and the detection period of the first light receiver 3 is 100 μm:

$$\Phi 2' = A\ TAN\ 2[S(A),S(B)] \qquad (12)$$

Furthermore, the signal processor 51 acquires the long period vernier signal Sv1 by the following calculation:

$$Sv1=\Phi 1-\Phi 1' \qquad (13)$$

When Sv1<0, the signal processor 51 performs a calculation of Sv1=Sv1+$2\pi$ to convert the long period vernier signal Sv1 to an output value within a range from 0 to $2\pi$. The long period vernier signal Sv1 thus acquired and position of the scale 2 (hereinafter referred to as "scale position") with respect to the sensor unit 7 in the position detection direction has a relation shown in FIG. 7A.

On the other hand, the signal processor 51 acquires the short period vernier signal Sv2 by the following calculation:

$$Sv2=\Phi 2-\Phi 2' \qquad (14)$$

The signal processor 51 performs a calculation of Sv2=Sv2+$2\pi$ when Sv2<0 and repeatedly performs the calculation of Sv2=Sv2+$2\pi$ when Sv2>0 to convert the short period vernier signal Sv2 to an output value within a range from 0 to $2\pi$. The short period vernier signal Sv2 thus acquired and the scale position with respect to the sensor unit 7 in the position detection direction has a relation shown in FIG. 7B.

The signal processor 51 defines the long period vernier signal Sv1 as a high-level signal acquired by the expression (13) and defines the short period vernier signal Sv2 as a middle-level signal acquired by the expression (14). Then, the signal processor 51 synchronizes the high-level signal Sv1 and the middle-level signal Sv2 to acquire position information (information showing absolute position) of the scale 2.

Next, description will be made of crosstalk caused by relative positional shift between the sensor unit 7 and the scale 2 in the scale width direction (Y direction) orthogonal to the positional detection direction (X direction). In the first and second scale tracks 8 and 11, the periodic patterns to be used for producing the high-level signal (long period vernier signal) Sv1 shown in FIG. 7A have the long periods P1 and P1', and are each disposed at a position of Y2 from the track boundary 31.

Figure 7A:
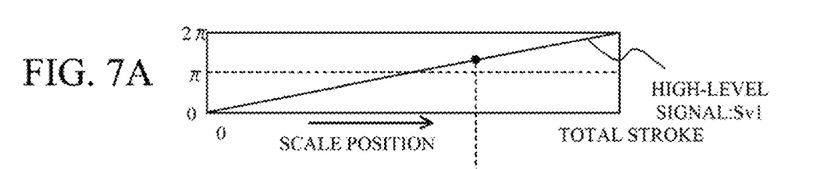
FIGS. 7A and 7B shows position detection in Embodiment 1.
Figure 7B:
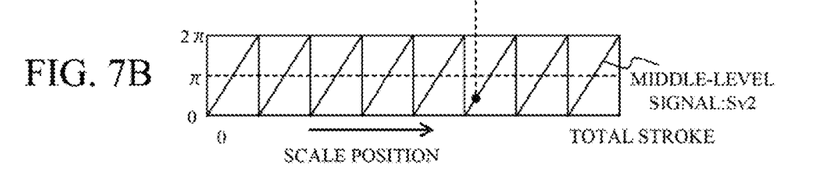

On the other hand, the periodic patterns to be used for producing the middle-level signal (short period vernier signal) Sv2 shown in FIG. 7B have the short periods P2 and P2'.

Figure 8:
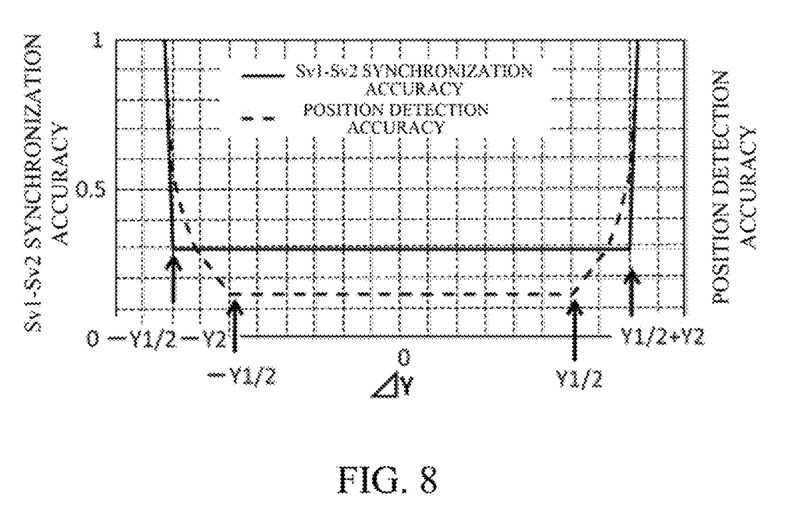
FIG. 8 is a graph showing a relation among relative positional shift amount between the scale and the sensor, synchronization accuracy and position detection accuracy in Embodiment 1.

FIG. 8 is a graph showing dependence of synchronization accuracy of the high- and middle-level signals Sv1 and Sv2 and dependence of position detection accuracy (detection accuracy of the absolute position) on relative positional shift amount between the sensor unit 7 and the scale 2 in the scale width direction when the scale 2 in this embodiment is used. A solid line shows the synchronization accuracy of the high- and middle-level signals Sv1 and Sv2, and a broken line shows the position detection accuracy. A horizontal axis of the graph shows the relative positional shift amount ΔY between the sensor unit 7 and the scale 2 in the scale width direction. A first vertical axis on a left side in the graph shows the synchronization accuracy between the high- and middle-level signals Sv1 and Sv2. A synchronization accuracy exceeding 1 makes it impossible to synchronize the high- and middle-level signals Sv1 and Sv2. On the other hand, a second vertical axis on a right side in the graph shows the position detection accuracy. Moreover, Y1 represents a distance between the light emitter 1 and the first and second light receivers 9 and 13 of the sensor unit 7 in the scale width direction (see FIG. 1B).

In the case of using the scale 2 shown in FIG. 3 for the encoder shown in FIG. 1, as shown in FIG. 8, a relative positional shift amount between the sensor unit 7 and the scale 2 within a range of ±(Y1/2+Y2) in the scale width direction gives no influence on the high-level signal Sv1. That is, an influence corresponding to Y2 on the synchronization accuracy between the high- and middle-level signals Sv1 and Sv2 can be avoided.

On the other hand, a relative positional shift amount between the sensor unit 7 and the scale 2 exceeding ±Y1/2 in the scale width direction gives an influence on the position detection accuracy decided by the middle-level signal Sv2. However, a significant deterioration of the position detection accuracy, such as causing of an error corresponding to at least one period of the middle-level signal Sv2 in the position detection accuracy as is the case where the high- and middle-level signals Sv1 and Sv2 cannot be synchronized can be avoided, and thereby the influence of the relative positional shift can be suppressed.

As described above, in the scale 2 in this embodiment, the periodic pattern to be used for producing the vernier periodic signal having the short (shortest) period is disposed closer to the track boundary 31 than the periodic pattern to be used for producing the vernier periodic signal having the long (longest) period. This arrangement suppresses the influence of the relative positional shift between the sensor unit 7 and the scale 2 in the scale width direction on the long period vernier signal. Therefore, an allowance amount of the relative positional shift between the sensor unit 7 and the scale 2 in the scale width direction can be increased, without increasing in size of the encoder that reads the periodic patterns in the multiple scale tracks to perform the vernier position detection. As a result, even if, in the apparatus using the encoder, a backlash amount of the movable member with respect to the fixed member in the scale width direction is large to some extent, position detection of the movable member with high accuracy can be made.

Embodiment 2

Next, description will be made of an encoder that is a second embodiment (Embodiment 2) of the present invention with reference to FIGS. 9 and 10. The encoder of this embodiment is configured to produce a higher-middle-level signal and a lower-middle-level signal between the high- and middle-level signals described in Embodiment 1 to be able to accept a long stroke with higher accuracy than that in Embodiment 1. This embodiment treats the middle-level signal described in Embodiment 1 as a low-level signal.

The configuration of the encoder of this embodiment is same as those of Embodiment 1 except that the periodic patterns are different from those in Embodiment 1. In this embodiment, description of a scale (2") is made by using reference numerals identical to those in Embodiment 1 and to which a mark (") is added, and description of other constituent elements than the scale 2" is made by using reference numerals identical to those in Embodiment 1.

Figure 9:
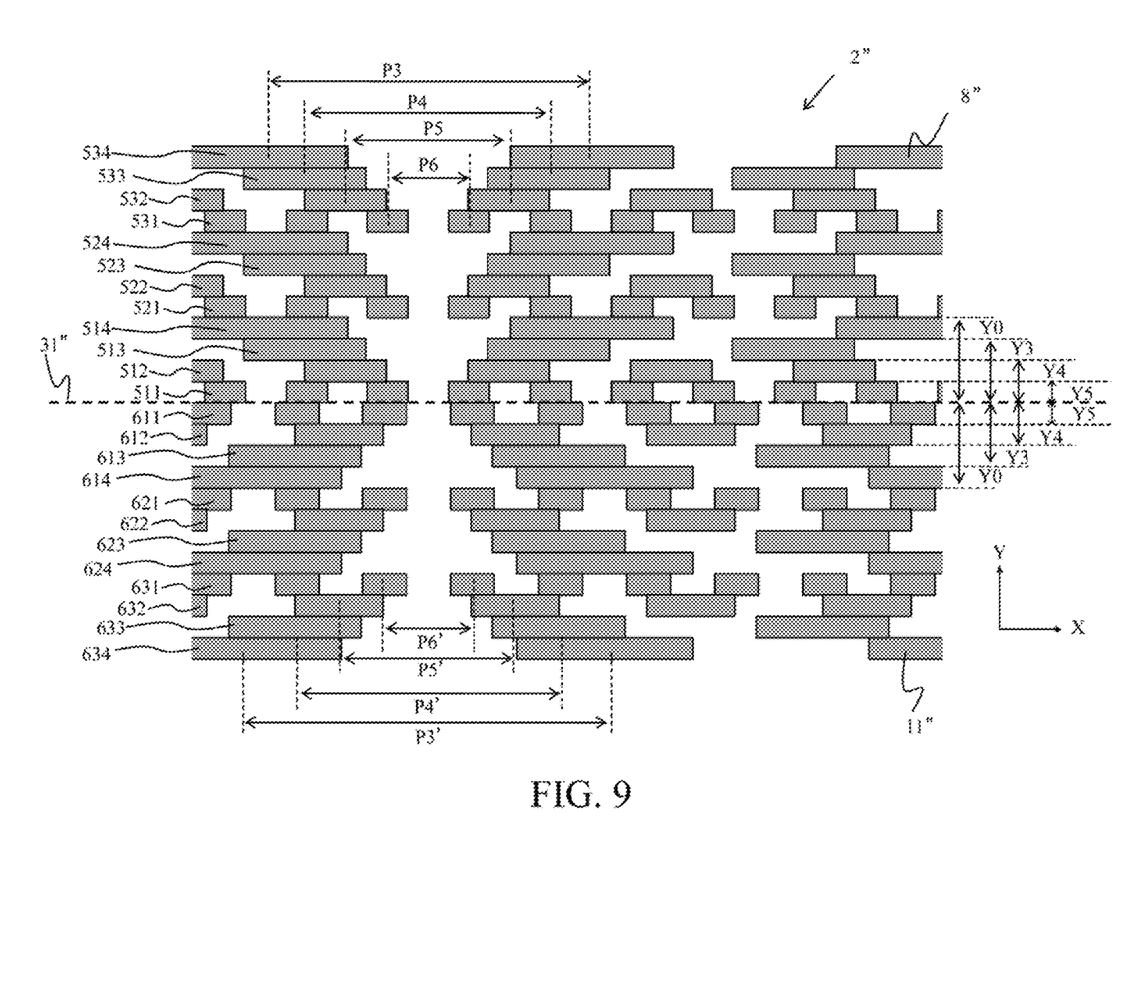
FIG. 9 is an enlarged view showing a boundary of scale tracks and a vicinity thereof on the scale in Embodiment 2 of the present invention.

FIG. 9 shows periodic patterns provided in a first scale track 8" and a second scale track 11" of the scale 2". FIG. 9 shows an enlarged view of the periodic patterns in a region close to a boundary (track boundary) 31" between the first and second scale tracks 8" and 11". In the first and second scale tracks 8" and 11" of an actual scale 2", a greater number of periodic patterns than the periodic patterns shown in FIG. 9 are provided in a scale width direction (Y direction).

In the first scale track 8", multiple (four types of) periodic patterns having mutually different periods (longest, second longest, third longest and shortest) P3, P4, P5 and P6 are provided. Specifically, longest period periodic patterns 514, 524 and 534 having the longest period P3, second longest period periodic patterns 513, 523 and 533 having the second longest period P4 shorter than the period P3, third longest period periodic patterns 512, 522 and 532 having the third longest period P5 further shorter than the period P4 and shortest period periodic patterns 511, 521 and 531 having the shortest period P6 are provided.

These four types of periodic patterns are arranged parallel in ascending order of period length from an inside (a first side, that is, a track boundary side closer to the track boundary 31") toward an outside (a second side, that is, an opposite-to-track boundary side farther from the track boundary 31") in the scale width direction. Furthermore, in this embodiment, three groups of the four types of periodic patterns are provided in the first scale track 8", and these three groups of the four types of periodic patterns are cyclically arranged according to a rule of arrangement in ascending order of period length.

Similarly, in the second scale track 11", multiple (four types of) periodic patterns having mutually different periods (longest, second longest, third longest and shortest) P3', P4', P5' and P6' are provided. Specifically, longest period periodic patterns 614, 624 and 634 having the longest period P3', second longest period periodic patterns 613, 623 and 633 having the second longest period P4' shorter than the period P3', third longest period periodic patterns 612, 622 and 632 having the third longest period P5' further shorter than the period P4' and shortest period periodic patterns 611, 621 and 631 having the shortest period P6' are provided.

These four types of periodic patterns are arranged parallel, as well as in the first scale track 8", in ascending order of period length from an inside (a first side, that is, a track boundary side closer to the track boundary 31") toward an outside (a second side, that is, an opposite-to-track boundary side farther from the track boundary 31") in the scale width direction. Furthermore, in this embodiment, three groups of the four types of periodic patterns are provided in the second scale track 11", and these three groups of the four types of periodic patterns are also cyclically arranged according to the rule of arrangement in ascending order of period length.

Of the periods of the four types of period periodic patterns provided in the first and second scale tracks 8" and 11", the longest periods P3 and P3' are slightly different from each other (P3<P3'). Moreover, the second longest periods P4 and P4' and the third longest periods 5 and 5' are also respectively slightly different from each other (P4<P4' and P5<P5'). Furthermore, the shortest periods P6 and P6' are also slightly different from each other (P6<P6').

In this embodiment, in the first and second scale tracks 8" and 11", the shortest period periodic patterns having the shortest periods P6 and P6' each correspond to "a first periodic pattern to be used for producing a vernier periodic signal having a shortest period". On the other hand, the longest period periodic patterns having the longest periods P3 and P3' each correspond to "a second periodic pattern to be used for producing a vernier periodic signal having a longest period". Furthermore, in this embodiment, in each scale track, the multiple periodic patterns are arranged parallel in ascending order of period length of the vernier periodic signal produced by using the periodic pattern from the inside toward the outside of the scale 2" in the scale width direction.

Moreover, also in this embodiment, the first and second scale tracks 8" and 11" are adjoined to each other at the track boundary 31", and the first periodic patterns, which are the periodic patterns having the shortest periods P6 and P6', are adjoined to the track boundary 31". In other words, the first periodic patterns (having the shortest periods P6 and P6') are adjoined to each other with the track boundary 31" located therebetween. However, the first periodic patterns included in the first and second scale tracks are not necessarily required to adjoin to the track boundary 31" or to each other, that is, these first periodic patterns may have a gap therebetween.

As well as described in Embodiment 1, the first periodic pattern is not necessarily required to be a periodic pattern having a shortest period in each scale track. In other words, an order of period length of the periodic patterns is not required to coincide with that of period length of vernier periodic signals to be produced.

In addition, also in this embodiment, an arrangement order of the multiple (four types of) periodic patterns in the scale width direction in the first scale track 8" and that of the multiple periodic patterns in the second scale track 11" are line symmetry with respect to the track boundary 31". That is, the periods of the periodic patterns in the first scale track 8" are P6, P5, P4, P3, P6, . . . from the track boundary 31" side toward the opposite-to-track boundary side, and the periods of the periodic patterns in the second scale track 11" are P6', P5', P4', P3', P6', . . . from the track boundary side toward the opposite-to-track boundary side. With this arrangement order, in each scale track, a second periodic pattern of the multiple (four types of) periodic patterns, which is used for producing a vernier periodic signal (longest period periodic signal) having a longest period among the vernier periodic signals to be produced, is provided farthest from the track boundary 31" among the multiple periodic patterns. The second periodic pattern in this embodiment corresponds to the periodic patterns having the longest periods P3 and P3' in the first and second scale tracks 8" and 11", respectively.

This embodiment describes the case where the first periodic patterns to be used for producing the vernier periodic signal having the shortest period is provided closest to the track boundary 31" among the multiple periodic patterns in both the first and second scale tracks 8" and 11". However, it is only necessary that, in at least one of the first and second scale tracks, the first periodic patterns to be used for producing the vernier periodic signal having the shortest period be provided closest to the track boundary among the multiple periodic patterns.

Figure 10A:
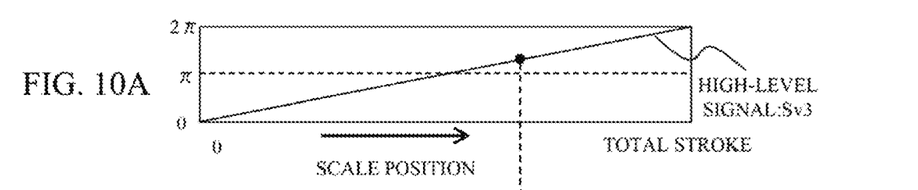
FIGS. 10A to 10D show position detection in Embodiment 2.
Figure 10B:
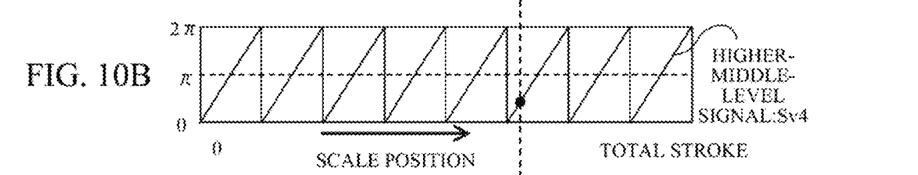
Figure 10C:
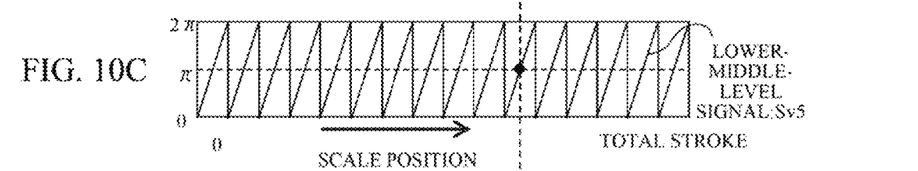
Figure 10D:
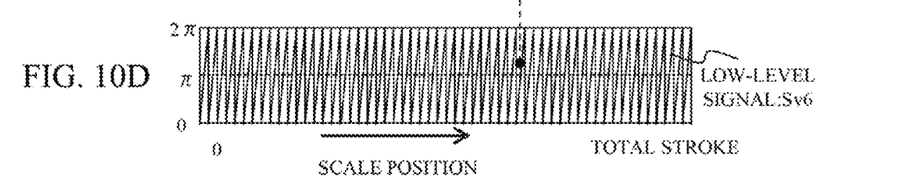

A vernier position detection method using the encoder of this embodiment produces, by a basically same process as that described in Embodiment 1, the following four vernier periodic signals. A signal processor 51 produces, as shown in FIG. 10A, a vernier periodic signal Sv3 as a high-level signal from sensor output signals acquired by reading of the paired longest period periodic patterns having the periods P3 and P3'. Moreover, the signal processor 51 produces, as shown in FIG. 10B, a vernier periodic signal Sv4 as a higher-middle-level signal from sensor output signals acquired by reading of the paired second longest period periodic patterns having the periods P4 and P4'. Furthermore, the signal processor 51 produces, as shown in FIG. 10C, a vernier periodic signal Sv5 as a lower-middle-level signal from sensor output signals acquired by reading of the paired third longest period periodic patterns having the periods P5 and P5'. Moreover, the signal processor 51 produces, as shown in FIG. 10D, a vernier periodic signal Sv6 as a low-level signal from sensor output signals acquired by reading of the paired shortest period periodic patterns having the periods P6 and P6'. Periods of these vernier periodic signals have a relation of Sv3>Sv4>Sv5>Sv6.

The signal processor 51 synchronizes the high-level signal Sv3, the higher-middle-level signal Sv4, the lower-middle-level signal Sv5 and the low-level signal Sv6 to acquire position information (information showing absolute position) of the scale 2".

Next, description will be made of crosstalk caused by relative positional shift between a sensor unit 7 and the scale 2" in the scale width direction (Y direction) orthogonal to a position detection direction (X direction). The periodic patterns to be used for producing the high-level signal (longest period vernier signal) Sv3 shown in FIG. 10A in the first and second scale tracks 8" and 11" have the longest periods P3 and P3', and are each disposed at a position of Y3 from the track boundary 31". With this arrangement, a relative positional shift amount between the sensor unit 7 and the scale 2" within a range of ±(Y1/2+Y3) in the scale width direction gives no influence on the high-level signal Sv3, that is, on synchronization accuracy between the high- and higher-middle-level signals Sv3 and Sv4. In other words, an influence corresponding to Y3 on the synchronization accuracy between the high- and higher-middle-level signals Sv3 and Sv4 can be avoided. Also in this embodiment, Y1 represents a distance between a light emitter 1 and first and second light receivers 9 and 13 of the sensor unit 7 in the scale width direction (see FIG. 1B).

Moreover, the periodic patterns to be used for producing the higher-middle-level signal (second longest period vernier signal) Sv4 shown in FIG. 10B in the first and second scale tracks 8" and 11" have the second longest (or third shortest) periods P4 and P4', and are each disposed at a position of Y4 (<Y3) from the track boundary 31". With this arrangement, a relative positional shift amount between the sensor unit 7 and the scale 2" within a range of ±(Y1/2+Y4) in the scale width direction gives no influence on the higher-middle-level signal Sv4, that is, on synchronization accuracy between the higher-middle- and lower-middle-level signals Sv4 and Sv5. In other words, an influence corresponding to Y4 on the synchronization accuracy between the higher-middle- and lower-middle-level signals Sv4 and Sv5 can be avoided.

Furthermore, the periodic patterns to be used for producing the lower-middle-level signal (third longest period vernier signal) Sv5 shown in FIG. 10C in the first and second scale tracks 8" and 11" have the third longest (or second shortest) periods P5 and P5', and are each disposed at a position of Y5 (<Y4) from the track boundary 31". With this arrangement, a relative positional shift amount of the sensor unit 7 and scale 2" within a range of ±(Y1/2+Y5) in the scale width direction gives no influence on the lower-middle-level signal Sv5, that is, on synchronization accuracy between the lower-middle- and low-level signals Sv5 and Sv6. In other words, an influence corresponding to Y5 on the synchronization accuracy between the lower-middle- and low-level signals Sv5 and Sv6 can be avoided.

As described above, in the scale 2" in this embodiment, the multiple periodic patterns are arranged from the track boundary side closer to the track boundary 31" toward the opposite-to-track boundary side farther from the track boundary 31" in ascending order of period length of the vernier periodic signals produced by using the periodic patterns. This arrangement suppresses influence of the relative positional shift between the sensor unit 7 and the scale 2" in the scale width direction more effectively on the vernier periodic signal having a longer period. Therefore, an allowance amount of the relative positional shift between the sensor unit 7 and the scale 2" in the scale width direction can be increased, without increasing in size of the encoder that reads the periodic patterns in the multiple scale tracks to perform the vernier position detection. As a result, even if, in an apparatus using the encoder, a backlash amount of a movable member with respect to a fixed member in the scale width direction is large to some extent, highly accurate position detection of the movable member can be made.

Although this embodiment described the case where the four types of periodic patterns are arranged from the track boundary side closer to the track boundary 31" toward the opposite-to-track boundary side farther from the track boundary 31" in ascending order of period length of the vernier periodic signals produced by using the periodic patterns, it is only necessary that the periodic pattern to be used for producing the vernier periodic signal having the shortest period be disposed closest to the track boundary among the four types of periodic patterns, and various arrangement orders for the other three types of periodic patterns may be employed.

Moreover, although Embodiments 1 and 2 described the configuration using the vernier periodic signal having the shortest period as the middle- or low-level signal and using the vernier periodic signal having the longest period as the high-level signal, a configuration may be employed which uses a vernier periodic signal having a shortest period as a lowest-level signal or uses a vernier periodic signal having a longest period as a highest-level signal. Also in this configuration, it is only necessary that a periodic pattern to be used for producing the vernier periodic signal having the shortest period be disposed closest to a track boundary among multiple periodic patterns, and a periodic pattern to be used for producing the vernier periodic signal having the longest period may be disposed farthest from the track boundary among the multiple periodic patterns.

Embodiment 3

Figure 11:
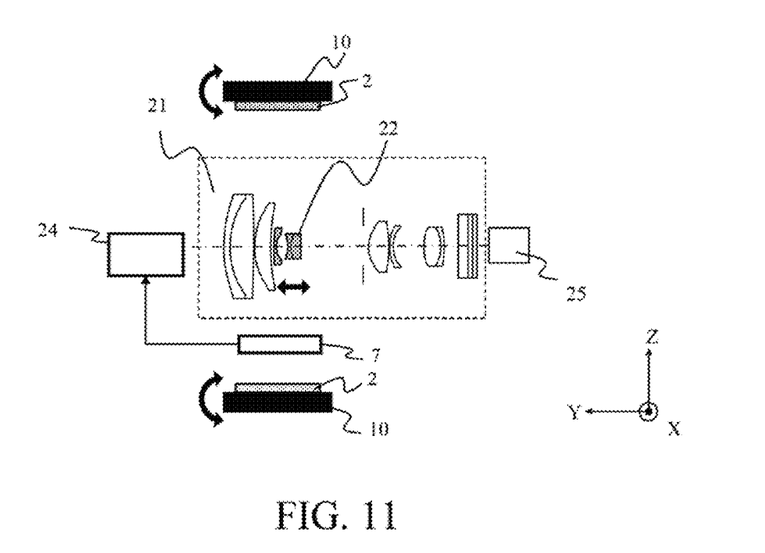
FIG. 11 shows a configuration of an image pickup apparatus that is Embodiment 3 of the present invention.

FIG. 11 shows a configuration of an image pickup apparatus (or an optical apparatus) such as a digital still camera or a video camera, as an example of the apparatus equipped with the encoder described in each of Embodiments 1 and 2; the image pickup apparatus is a third embodiment (Embodiment 3) of the present invention. The encoder is provided in a lens barrel of the image pickup apparatus.

In FIG. 11, reference numeral 21 denotes an image capturing optical system, and 22 a movable lens that is part of the image capturing optical system 21. Reference numeral 7 denotes the sensor unit 7 described in Embodiments 1 and 2 and attached to a chassis (not shown) as a fixed member of the lens barrel. Reference numeral 24 denotes a CPU including the signal processor 51 described in Embodiments 1 and 2. Reference numeral 25 denotes an image sensor constituted by a CCD sensor or a CMOS sensor.

The movable lens 22 is used for autofocus or variation of magnification and is movable in the Y direction corresponding to a direction in which an optical axis extends (hereinafter referred to as "an optical axis direction"). Reference numeral 10 denotes a cam barrel (movable member) rotatable about the optical axis. The cam barrel 10 includes a cam (not shown) in its circumferential wall portion and drives the movable lens 22 in the optical axis direction by the cam.

The cam barrel 10 is rotationally driven by an actuator (not shown) such as a motor. Reference numeral 2 denotes the scale 2 described in Embodiment 1 or the scale 2" described in Embodiment 2. The scale 2 is attached to an inner circumferential surface of the cam barrel 10 such that the position detection direction matches a rotation direction of the cam barrel 10.

In response to movement of the movable lens 22 in the optical axis direction with rotation of the cam barrel 10, the CPU 24 performs the vernier operation described in Embodiments 1 and 2 on the sensor output signals obtained from the sensor unit 7 to detect a rotation position of the cam barrel 10. Since the rotation position of the cam barrel 10 corresponds to a position of the movable lens 22 in the optical axis direction, the CPU 24 can detect the position of the movable lens 22. The CPU 24 controls the actuator with monitoring of the detected position of the movable lens 22 to move the movable lens 22 to a target position.

The cam barrel 10 has mechanical backlash with respect to the chassis of the lens barrel in the optical axis direction. Therefore, the cam barrel 10 being rotated is displaced, together with the scale 2 attached thereto, with respect to the sensor unit 7 attached to the chassis in the optical axis direction corresponding to the scale width direction. However, the encoder described in Embodiments 1 and 2 allows a certain large amount of relative positional shift between the scale 2 and the sensor unit 7. Therefore, highly accurate detection of the rotation position of the cam barrel 10 (that is, of the position of the movable lens 22 in the optical axis direction) can be made, without specially increasing dimension accuracy of parts constituting the lens barrel, such as the chassis or the cam barrel 10, and assembly accuracy of the lens barrel.

Although this embodiment described the configuration in which the movable member to which the scale is attached is moved (rotated) with respect to the fixed member to which the sensor unit is attached, a configuration may be employed in which a movable member to which the sensor unit is attached is moved with respect to a fixed member to which the scale is attached.

Moreover, the encoder described in Embodiment 1 or 2 can be used not only for the above-described image pickup apparatus, but also for various apparatuses including a movable member, such as a printer (optical apparatus) performing position detection of a print head or a sheet-supplying roller, a copier (optical apparatus) performing position detection of a photoconductive drum, and an assembling apparatus including a robot arm and a carrying member to carry an assembling object and performing position detection of the robot arm or the carrier member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-105710, filed on May 7, 2012 which is hereby incorporated by reference herein in its entirety.

What is claimed is:

1. A scale for a vernier encoder including a sensor relatively movable with the scale in a first direction and configured to read periodic patterns provided in the scale, the scale comprising:
a first scale track and a second scale track each including multiple periodic patterns (a) having mutually different periods in the first direction and (b) being arranged parallel in a second direction orthogonal to the first direction,
wherein the first and second scale tracks provide a plurality of paired periodic patterns, each pair including one period pattern from the first scale track and one periodic pattern from the second scale track, including:
first paired periodic patterns having mutually different periods for producing a first periodic signal by a vernier operation performed on output from the sensor that reads the first paired periodic patterns, the first periodic signal having a shortest period among multiple periodic signals produced from the output from the sensor that reads the plurality of paired periodic patterns; and
second paired periodic patterns having mutually different periods for producing a second periodic signal by the vernier operation performed on output from the sensor that reads the second paired periodic patterns, the second periodic signal having a longer period than that of the first periodic signal among the multiple periodic signals, the first and second periodic signals being used in combination with each other to provide position information, and
wherein, among the plurality of paired periodic patterns, the first paired periodic patterns are provided closest to a boundary between the first and second scale tracks, and the second paired periodic patterns are provided farther from the boundary than the first paired periodic patterns.

2. A scale according to claim 1, wherein:
the first and second scale tracks are adjoined to each other, and
the first paired periodic patterns are adjoined to the boundary between the first and second scale tracks.

3. A scale according to claim 1, wherein the first paired periodic patterns are adjoined to each other across the boundary between the first and second scale tracks.

4. A scale according to claim 1, wherein the second periodic patterns, which are used for producing the second periodic signal having a longest period among the multiple periodic signals, are provided farthest from the boundary between the first and second scale tracks among the plurality of paired periodic patterns.

5. A scale according to claim 1, wherein the plurality of paired periodic patterns are arranged parallel from a first side closer to the boundary between the first and second scale tracks toward a second side farther from the boundary in ascending order of period length of periodic signals produced using the plurality of paired periodic patterns.

6. A vernier encoder comprising:
a scale; and
a sensor relatively movable with the scale in a first direction and configured to read periodic patterns provided in the scale,
wherein the scale comprises:
a first scale track and a second scale track each including multiple periodic patterns (a) having mutually different periods in the first direction and (b) being arranged parallel in a second direction orthogonal to the first direction,
wherein the first and second scale tracks provide a plurality of paired periodic patterns, each pair including one period pattern from the first scale track and one periodic pattern from the second scale track, including:
first paired periodic patterns having mutually different periods for producing a first periodic signal by a vernier operation performed on output from the sensor that reads the first paired periodic patterns, the first periodic signal having a shortest period among multiple periodic signals produced from the output from the sensor that reads the plurality of paired periodic patterns; and
second paired periodic patterns having mutually different periods for producing a second periodic signal by the vernier operation performed on output from the sensor that reads the second paired periodic patterns, the second periodic signal having a longer period than that of the first periodic signal among the multiple periodic signals, the first and second periodic signals being used in combination with each other to provide position information, and
wherein, among the plurality of paired periodic patterns, the first paired periodic patterns are provided closest to a boundary between the first and second scale tracks, and the second paired periodic patterns are provided farther from the boundary than the first paired periodic patterns.

7. A vernier encoder according to claim 6, wherein the sensor comprises:
a light emitter; and
a light receiver to receive light emitted from the light emitter and transmitted through or reflected by the periodic pattern provided in the scale.

8. An apparatus comprising:
a vernier encoder comprising a scale and a sensor, the sensor being configured to read periodic patterns provided in the scale; and
a movable member to which one of the scale or the sensor is attached and which is movable with respect to a fixed member to which the other of the scale or the sensor is attached,
wherein the scale comprises:
a first scale track and a second scale track each including multiple periodic patterns (a) having mutually different periods in a first direction and (b) being arranged parallel in a second direction orthogonal to the first direction, wherein the first and second scale tracks provide a plurality of paired periodic patterns, each pair including one period pattern from the first scale track and one periodic pattern from the second scale track, including:

first paired periodic patterns having mutually different periods for producing a first periodic signal by a vernier operation performed on output from the sensor that reads the first paired periodic patterns, the first periodic signal having a shortest period among multiple periodic signals produced from the output from the sensor that reads the plurality of paired periodic patterns; and second paired periodic patterns having mutually different periods for producing a second periodic signal by the vernier operation performed on output from the sensor that reads the second paired periodic patterns, the second periodic signal having a longer period than that of the first periodic signal among the multiple periodic signals, the first and second periodic signals being used in combination with each other to provide position information, and wherein, among the plurality of paired periodic patterns, the first paired periodic patterns are provided closest to a boundary between the first and second scale tracks, and the second paired periodic patterns are provided farther from the boundary than the first paired periodic patterns.

* * * * *